United States Patent
Culbreth et al.

(10) Patent No.: US 7,802,267 B2
(45) Date of Patent: Sep. 21, 2010

(54) COMPLIANCE INTERFACE FOR COMPLIANT APPLICATIONS

(75) Inventors: Aaron Culbreth, Bellevue, WA (US); Keumars A. Ahdieh, II, Lake Stevens, WA (US); Peter M. Wiest, Issaquah, WA (US); Roderick M. Toll, Sammamish, WA (US); Roger H. Wynn, Redmond, WA (US); Stan Dale Pennington, Newcastle, WA (US); Timothy Arthur Gill, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 11/266,143

(22) Filed: Nov. 3, 2005

(65) Prior Publication Data

US 2007/0124739 A1     May 31, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/328; 713/182; 726/30
(58) Field of Classification Search ............. 713/201, 713/182; 726/1, 30; 719/328
See application file for complete search history.

(56) References Cited

U.S. PATENT DOCUMENTS

| | | | |
|---|---|---|---|
| 5,654,746 A | 8/1997 | McMullan, Jr. et al. | 348/6 |
| 5,987,611 A * | 11/1999 | Freund | 726/4 |
| 6,324,578 B1 * | 11/2001 | Cox et al. | 709/223 |
| 6,499,679 B1 * | 12/2002 | Woodruff et al. | 239/687 |
| 7,197,764 B2 * | 3/2007 | Cichowlas | 726/6 |
| 7,380,267 B2 * | 5/2008 | Arai et al. | 726/1 |
| 2001/0007133 A1 * | 7/2001 | Moriconi et al. | 713/201 |
| 2002/0049806 A1 | 4/2002 | Gatz et al. | 709/203 |
| 2002/0099952 A1 * | 7/2002 | Lambert et al. | 713/200 |
| 2002/0104015 A1 * | 8/2002 | Barzilai et al. | 713/201 |

(Continued)

FOREIGN PATENT DOCUMENTS

| | | |
|---|---|---|
| WO | WO 00/30345 A1 | 5/2000 |
| WO | WO 01/88672 A3 | 11/2001 |

OTHER PUBLICATIONS

Karjoth, Access Control with IBM Tivoli Access Manager, ACM, May 2003, pp. 232-257.*

(Continued)

*Primary Examiner*—Diem K Cao
(74) *Attorney, Agent, or Firm*—Woodcock Washburn LLP (57) ABSTRACT

A compliance interface is disclosed that takes in queries from applications which may want to know if they are compliant with associated polices stored on a computing system. The interface can then interpret these queries and provide notifications and instructions to the applications. Notifications may give notice of how a policy may impact an application, and instructions may tell an application how to behave in order to stay compliant with the policies. In one aspect, the interface exposes policies set forth by parents. Via a management control panel, parents can set or alter various policies, stored in a settings store, to protect children from contact with undesirable content. The interface interprets these policies to ensure that applications, such as those provided by third party vendors, are compliant with the wishes set forth in the parents' policies.

17 Claims, 5 Drawing Sheets

U.S. PATENT DOCUMENTS

| | | | |
|---|---|---|---|
| 2002/0128061 A1 | 9/2002 | Blanco | 463/29 |
| 2003/0014750 A1 | 1/2003 | Kamen | 725/25 |
| 2004/0088553 A1 | 5/2004 | Levin et al. | 713/186 |
| 2004/0210633 A1* | 10/2004 | Brown et al. | 709/203 |
| 2004/0216147 A1* | 10/2004 | Yanosy et al. | 719/328 |
| 2005/0021467 A1* | 1/2005 | Franzdonk | 705/51 |
| 2005/0028191 A1 | 2/2005 | Sullivan et al. | 725/28 |
| 2005/0166060 A1 | 7/2005 | Goldthwait et al. | 713/182 |

OTHER PUBLICATIONS

"Broadcast services for Microsoft Windows CE set-top boxes," *Microsoft Corp.*, 1999, downloaded Sep. 16, 2005, 1-11.

"iProtectYou—internet filtering," *SnapFiles*, downloaded Sep. 16, 2005, http://www.snapfiles.com/get/iprotectyou.html, 2 pages.

"Norton Internet Security 2005—complete package by Symantec," *Windows Marketplace*, 2005, 2 pages.

* cited by examiner

COMPLIANCE INTERFACE FOR COMPLIANT APPLICATIONS

CROSS-REFERENCE TO RELATED APPLICATIONS

This application is related to U.S. patent application Ser. No. 60/716,294, filed Sep. 12, 2005, and to U.S. patent application Ser. No. 11/326,284, filed Jan. 4, 2006.

BACKGROUND

An operating system platform is typically designed to allow a user as much operational freedom as possible. Therefore, any restrictions that are placed on such a platform (and its associated applications), are typically difficult to implement, since often times they go against the intended design of the platform. This difficulty may be compounded if restrictions are to be placed on applications provided by third party vendors.

Third party vendors may provide all kinds of applications, ranging from instant messenger applications, to games, to email applications. Likewise, the platform itself may provide a multitude of system applications, media applications, or web applications.

There may be various reasons why restrictions would be placed on such applications. For example, parents might want to have a mechanism for locking down content that might be deemed harmful to children. Such a mechanism could be implemented in the form of a parental control panel.

To provide such a parental control panel capability, an interface could be provided that is able to communicate with applications that are compliant with policies set forth by the parents. The policies themselves could be stored on a computing system, and any compliant application could then communicate via the interface to determine whether it should be running or not, and what features it can expose to certain users. It would therefore be desirable to introduce such an interface that can mediate between compliant applications and restriction policies set forth by administrators of a computing system.

SUMMARY

A compliance interface is provided, whereby this interface can mediate between compliant applications and policies set forth by computer users. The interface can receive query requests from applications that want to know if what they are doing complies with the policies. Upon receipt of such queries, the interface can provide information to the applications so that they can comply with the policies. Or, in addition, the interface can also provide notifications to the applications, where such notifications provide information regarding polices that may have a direct or indirect impact on the applications.

In one aspect of the presently disclosed subject matter, the compliant interface can be a parental controls interface which interprets policies set forth by parents to protect children from undesirable content. Thus, polices may be set forth by parents that impact the behavior of system applications, web applications, instant messenger applications, email applications, media applications, and so forth. Such polices may apply across an entire computing system, and they may be stored in silos in a settings store. Parents can set or alter these stored policies via a management control panel.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Various aspects of the presently disclosed subject matter are discussed in detail herein. First, with reference to FIG. 1, the compliance interface is discussed in context, that is, in a typical environment or system in which it may function. Second, specific features of the compliance interface are discussed with reference to FIG. 2. The focus is on compliance interfaces that may be associated with one typical compliant application, such as an instant messenger application. Third, associated aspects to the compliance interface are discussed with reference to FIGS. 3 and 4, such as a settings store that contains policies for the compliance interface to interpret. Finally, with reference to FIG. 5, an exemplary implementation of the compliance interface is provided.

Aspects of the Compliance Application Programming Interface (API)

The compliance interface can mediate between compliant applications and restriction policies set by users. In one aspect of the presently disclosed subject matter, the compliance interface is a parental controls API, suitable for interpreting polices set by parents for the benefit of children.

Figure 1:
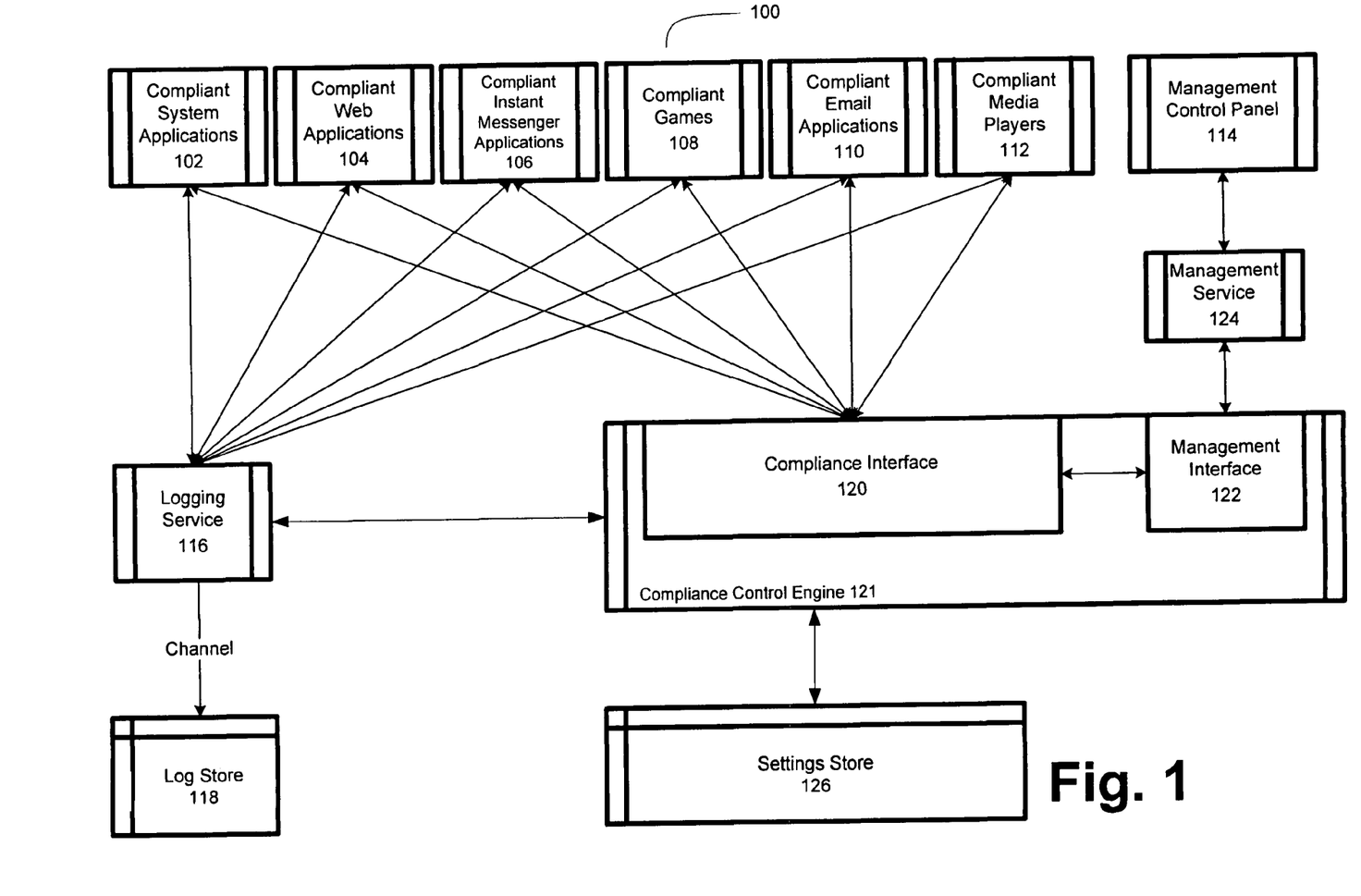
FIG. 1 illustrates a system level view of a suitable environment for a compliance interface.

FIG. 1 illustrates a system 100 level view of a suitable environment for a compliance interface. The compliance interface 120 (which, specifically, may be a parental controls API) interprets computing system platform settings stored in a settings store 126. The computing platform may be any suitable operating system that can have associated policies, which may be set by users, such as parents.

If a parent wants to restrict some programs or applications a child is playing, the parent may do so via a control panel 114. If the application is compliant to the settings set by the parent, it can contact the compliance interface 120 and inquire what it must do to stay compliant. For instance, the compliance interface 120 can check the settings and give an answer to the querying game at once, without having the game ask five or six (or more) separate questions. Put another way, the compliance interface 120 can perform the work of checking multiple settings in the settings store 126 and provide an answer to a specific question put forth by any of the external applications 102, 104 . . . 112, and so on.

The compliance control engine 121, in turn, can keep track of all the settings in the settings store 126 and monitor what applications can or cannot do (or should or shouldn't do). The compliance interface 120 can run on top of the engine 121 along with a management interface 122, which provides a settings exposure for all the settings for parental controls. It can allow for remote administration and many other useful functionalities.

In one aspect of the presently disclosed subject matter, the compliance interface 120 may be a kind of distillation of the management interface 122 in the sense that the compliance interface represents all the relevant interfaces for a third party client who manufactures compliant applications 102, 104 . . . 112.

The management service 124 can be a common entry point to all management interfaces contained in the management interface module 122. The service 124 can be an interface that is modifiable based on the providers that are available. It can also provide a way to query other interfaces and to perform either local or remote administration. In this latter case, the service 124 allows an administrator on one machine to set the setting on another machine. Thus, for example, a parent in one room could use the service 124 to set the setting on a computer in a child's room without ever having to physically go to the child's room.

Specifically, regarding this last point, the parent may set policies to restrict a child's use of a computer through the management control panel 114. This control panel 114 allows a parent to set or alter whatever policies that are associated with external applications 102, 104 . . . 112. For example, if a parent wants to set a policy regarding web surfing, the parent can do so via the management control panel 114.

The system 100 may also have a settings store 126 that can contain various policies stored in policy silos. Such silos can be stored on a per-machine basis, a per-controlled user basis, or other set-ups. The silos can pertain to system policies, user policies, game policies, web policies, and so on. They may be based on various heuristics and studies that shed light on what types of behaviors one user, such as a parent, may want to restrict another user, such as a child, from engaging in. Those of skill in the art will readily appreciate the various policies that may be used.

And lastly, the system 100 may also use a logging service 116 with its corresponding log store 118. The logging service 116 may provide feedback to a compliance control engine 121, as to what events have happened (i.e. have been logged). This information can in turn be used to ensure that various policies stored in the settings store 126 have not been obviated.

The system 100 depicted in FIG. 1 is merely exemplary, and the compliance interface 120 may be implemented in other environments as well, where an API may be useful in interpreting settings as to which action an application can take. In fact, FIG. 2 illustrates some of the general components of the compliance interface 204 that may be employed in just about any computing environment where parental control setting may be used.

Aspects of Exemplary Interfaces In Compliance Interface

Figure 2:
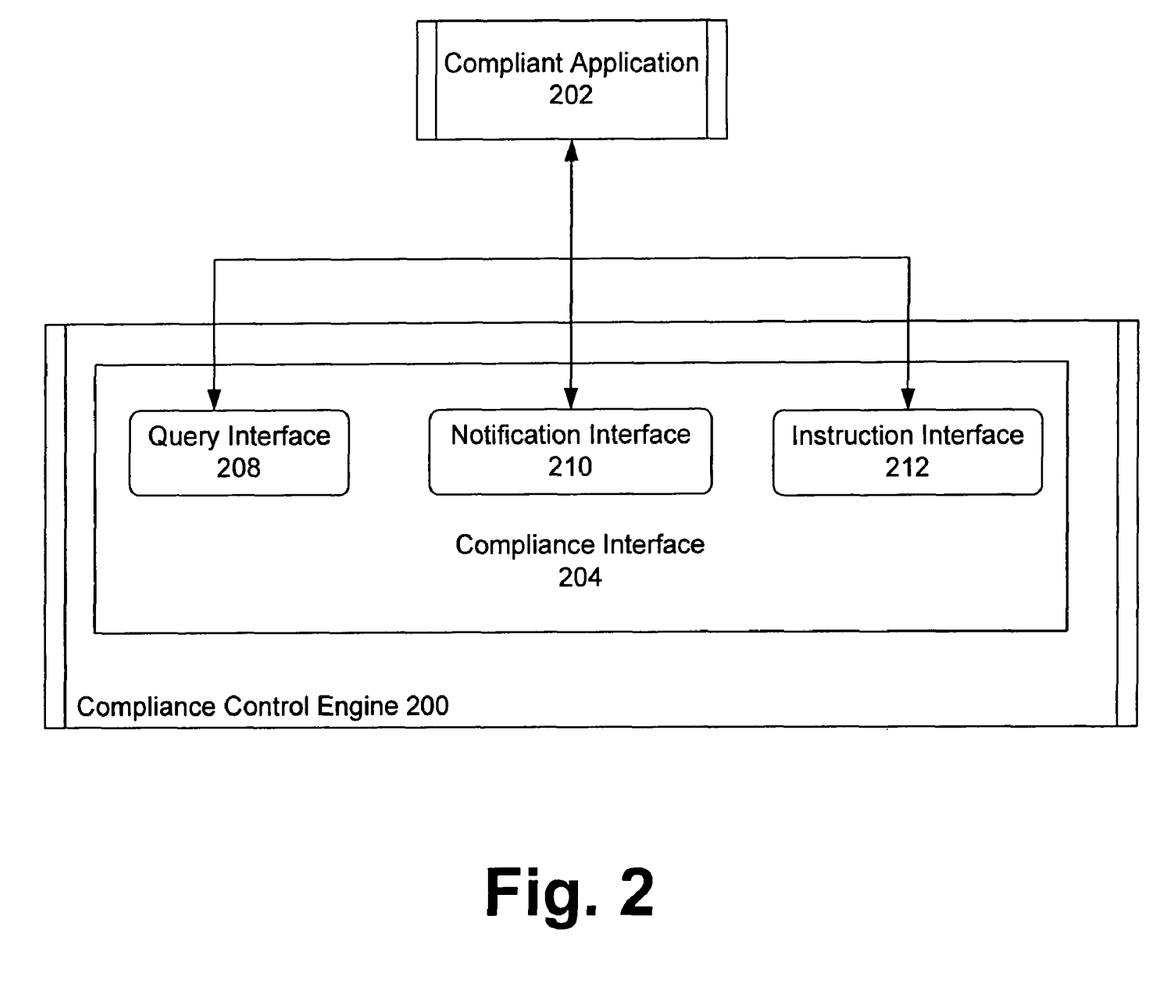
FIG. 2 illustrates some of the general components of the compliance interface that may be employed in just about any computing environment where parental control setting may be used.

FIG. 2 illustrates in more detail the kind of interfaces the compliance interface as a whole contains. These interfaces 208, 210, and 212 are abstractions of the particular interfaces discussed in more detail below. For example, the compliance interface 204 may contain a query interface 208 that allows a compliant application 202, such as one provided by a third party vendor, to query what the application is allowed to do or not allowed to do according to policies stored in the settings store (see FIGS. 1 and 3). An application could, for instance, query whether it could run a violent video game or to allow file download from a particular website.

Additionally, a notification interface 210 can be provided, where the notification interface 210 can provide some kind of notification to the compliant application 202 as to which policies are being implemented by the computing system—on which the compliance interface 204 resides. For example, such a notification may be warranted in the scenario where a system policy is implemented allowing a particular user a limited log-on time, say, one hour, after which the user is logged out. Other compliant applications, such as a media player may want to be notified of the one-hour log-out policy since the media player may want to stop playing contemporaneously with the log-out (the user may not appreciate having a song playing and not being able to stop it because the user has been logged out). Thus, a notification can be provided from the compliance interface 204 to the compliant media player application 202, warning the application 202 that a particular policy may be implemented that might impact the application 202.

Not only may the compliance interface 204 give notifications, but it may also give instructions to the compliant application 202. A notification may give information as to what a computing system is doing and the kind of policies it has in place, but an instruction can further demand or suggest a particular behavior it wants the compliant application 202 to implement per a particular policy. Thus, additionally, the compliance interface 204 may have an instruction interface 212 that provides instructions that the compliant application 202 has to follow (or at least should follow).

These query 208, notification 210, and instruction interfaces 212, are, of course, merely abstractions of more particular interfaces that may be implemented. Nor should these general interfaces be interpreted as being limited to three general kinds of interfaces—they are merely exemplary and not limiting, and other kinds of interfaces may be employed. Also, those of ordinary skill in the art will readily appreciate that, for example, the query interface 208 and the notification interface 210 may be separately implemented or implemented together (e.g. upon a query, a notification is provided), depending on the design choices of developers or others implementing the compliance interface 204.

By way of example only and not limitation, more specific interfaces may be implemented for compliant applications 202, such as the instant messenger application 106 discussed with reference to FIG. 1. Thus, a public interface can be provided that returns a set of flags as part of an argument to various functions (in this-case, for example, the WPCIsIMContactBlocked and the WPCAreIMFeaturesBlocked functions—see below for more):

```
typedef enum tagWPCFLAG_ISBLOCKED
{
WPCFLAG_ISBLOCKED_NOTBLOCKED,
WPCFLAG_ISBLOCKED_IMBLOCKED,
WPCFLAG_ISBLOCKED_EMAILBLOCKED,
WPCFLAG_ISBLOCKED_MEDIAPLAYBACKBLOCKED,
WPCFLAG_ISBLOCKED_WEBBLOCKED,
```

```
WPCFLAG_ISBLOCKED_GAMESBLOCKED,
WPCFLAG_ISBLOCKED_CONTACTBLOCKED,
WPCFLAG_ISBLOCKED_FEATUREBLOCKED,
WPCFLAG_ISBLOCKED_DOWNLOADBLOCKED,
WPCFLAG_ISBLOCKED_RATINGBLOCKED,
WPCFLAG_ISBLOCKED_DESCRIPTORBLOCKED,
WPCFLAG_ISBLOCKED_EXPLICITOVERRIDE,
} WPCFLAG_ISBLOCKED;
#define WPCFLAG_ISBLOCKED_INTERNALERROR 0xFFFFFFFF
```

As is highlighted above in italics, the second argument from the top, "WPCFLAG_ISBLOCKED_IMBLOCKED" returns an argument whether the instant messenger is a blocked program or not, based on a policy or a set of policies residing in the aforementioned settings store.

Next, an enumeration interface can be provided (WPCFLAG_IM_SETTING) that defines the possible settings values for calls to an instant messenger settings function (WPCGetIMSettings—see below for more):

```
typedef enum tagWPCFLAG_IM_SETTING
{
WPCFLAG_IM_SETTING_BLOCKED,
WPCFLAG_IM_SETTING_FULLLOGREQUIRED
} WPCFLAG_IM_SETTING;
```

Also, another enumeration can be provided, defining the possible instant messenger features which can be enabled or blocked by the aforementioned parental controls panel:

```
typedef enum tagWPCFLAG_IM_FEATURE
{
WPCFLAG_IM_FEATURE_VIDEO,
WPCFLAG_IM_FEATURE_AUDIO,
WPCFLAG_IM_FEATURE_GAME,
WPCFLAG_IM_FEATURE_SMS,
WPCFLAG_IM_FEATURE_FILESWAP,
WPCFLAG_IM_FEATURE_URLSWAP
} WPCFLAG_IM_FEATURE;
```

As can be seen directly above, various features can be affected by the settings store policies, such as video, audio, games, sms, file swap, URL swap, and so on.

Next, the WPCGetIMSettings function (already mentioned above), may be called by all compliant instant messaging applications:

HRESULT WPCGetIMSettings(_in_opt PSID pSID, _out DWORD* pdwSettings)

In this case, the pSID argument may input the personal security identification of a user, and the pdwSettings argument may return a set of zero or more WPCFLAG_IM_SETTING flags (discussed above). The possible settings values may be: instant messaging is blocked for a particular user context, and the application should notify such a user of this fact and exit; or, an application is required to log full text of chat conversations for a particular user.

Another interface to a function may be provided that should be called by all compliant instant messaging applications at least whenever the user (a) sends a conversation invitation, (b) receives a conversation invitation, (c) attempts to join a conversation, or (d) is in a conversation a new member joins:

HRESULT WPCIsIMContactBlocked(_in_opt PSID pSID, _in PCWSTR pcszEmailAddress, _out BOOL* pfBlocked)

The pSID argument is the same as in the previous function, containing a user's personal security identification information; the pcszEmailAddress argument may contain information regarding the email address of the contact that is being checked; and, the pfBlocked argument returns a TRUE value if the contact is blocked for the user. Other, arguments and equivalent interfaces can be used as part of the overall compliance interface.

Instant messaging applications detecting a blocked contact may choose to enable the user to request a permanent change to the setting using an administrator override functionality. This results in the system requesting an administrator login in order to unblock the contact permanently. The associated interface may be the following:

HRESULT WPCRequestIMContactOverride(_in PCWSTR pcszEmailAddress)

In this interface, the blocked email address may be overridden via the pcszEmailAddress arugument.

Another interface to a function that may be provided may be useful whenever a user wishes to enable extended messaging features:

HRESULT WPCAreIMFeaturesBlocked(_in_opt PSID pSID, DWORD dwFeatures, _out DWORD* pdwBlockedBlockedFeatures) pSID, as before, may be the personal security identification; dwFeatures may describe the set of features the application wishes to enable (see the WPCFLAG_IM_FEATURE interface above); and pdwBlockedFeatures may return a zero or more of the features which are blocked for a user.

Yet another interface may be used that allows for instant messenger feature override:

HRESULT WPCRequestIMFeatureOverride(WPCFLAG_IM_FEATURE eFeature) In this interface, eFeature may represent the instant messaging feature to be requested. Instant messaging applications detecting a blocked feature may choose to enable the user to request a permanent change to the setting using the administrator override functionality. This may result in the system requesting an administrator login in order to unblock the feature permanently.

Lastly, the compliance interface may also have general functions not necessarily associated with any particular kind of application. For example, an interface to a function may be provided to determine whether logging is required for a current user context:

HRESULT WPCIsLoggingRequired(_out BOOL* pfRequired)

The pfRequired argument can return a Boolean value as to whether logging is required for a current account.

As mentioned above already, these interfaces for the instant messaging application are exemplary (and not limiting) of the kinds of interfaces that may be used by the compliance interface. Other appropriate interfaces for the other applications, for instance, system applications, web applications, games applications, email applications, media player applications, etc., may also be used—as those of ordinary skill in the art will appreciate.

Associated Aspects of the Compliance Interface

The various aspects of the compliance interface may also be associated with complementary aspects. For example, as discussed with reference to FIG. 1, these associated aspects may include a logging service, an interface management module, a settings store, a management control panel, and so on.

Figure 3:
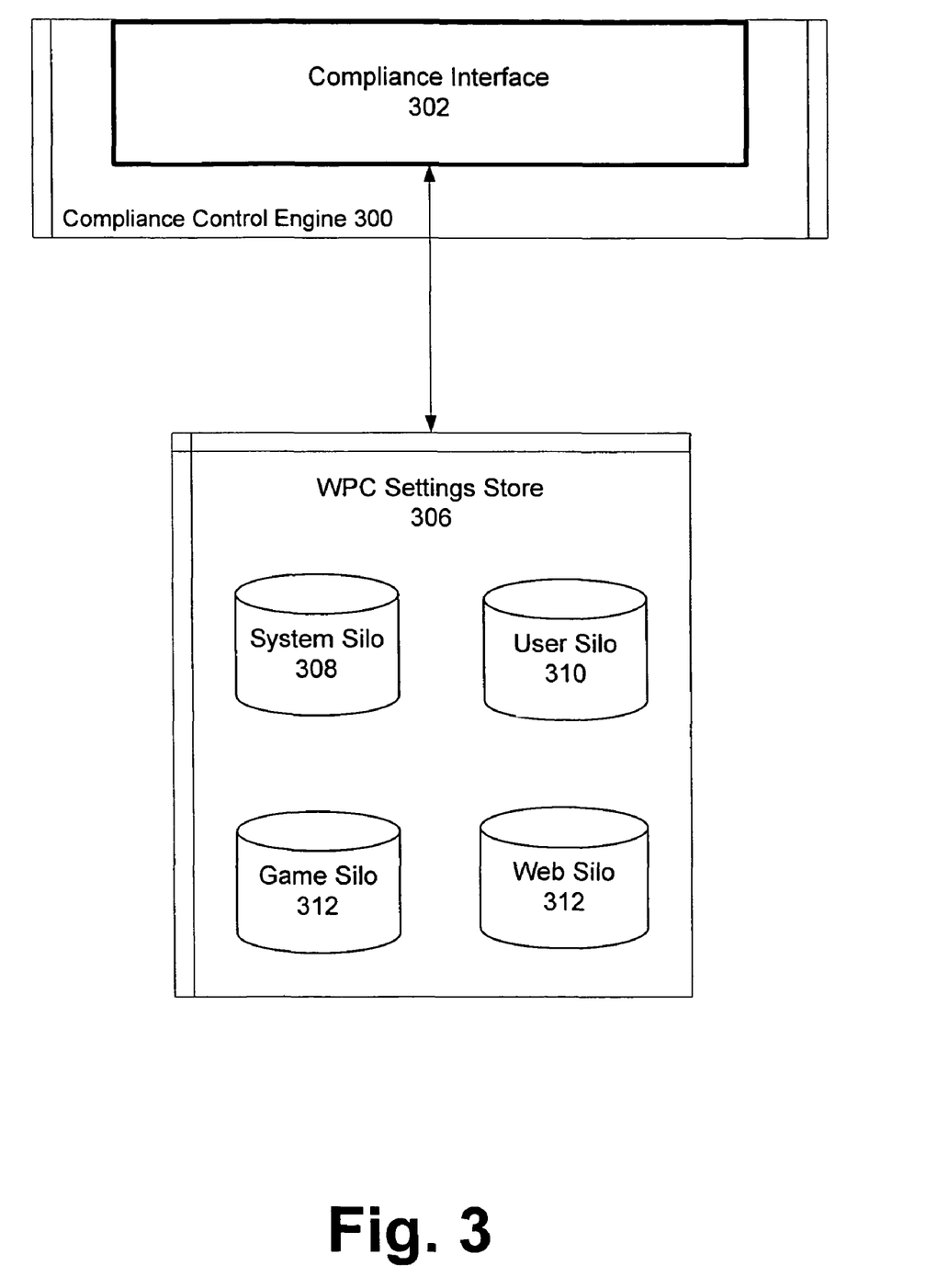
FIG. 3 illustrates in detail the kinds of policies that may be stored in a settings store and the manner in which they may be stored, so that these polices can be readily used by the compliance interface.

FIG. 3 illustrates in detail the kinds of policies that may be stored in a settings store and the manner in which they may be stored—for use by the compliance interface. Per FIG. 3, a compliance control engine 300 may serve as a mechanism to access policies stored in the settings store 306. Upon some query from some compliant application (not shown), the compliance interface 302 can use the engine 300 to query the settings store 306 for particular policies, and then it can interpret that policy. As mentioned already above, such policies may be stored in silos—but this is merely an exemplary implementation, and various other equivalent storing mechanisms could just as easily be used.

By example only and not limitation, a system silo 308 is disclosed. This silo can be implemented on a per-machine basis, which means that each machine may have its own silo. However, this is merely an implementation detail, and silos could just as easily be stored on a multiple-machine basis, such as in a distributed computing environment.

The system silo 308 may contain a current rating system for games to be played on a given machine. The silo 308 can also contain an indication that may or may not indicate to a user whether they are being monitored. Furthermore, the silo 308 can contain a list of applications allowed to bypass a web filter. Moreover, it can contain a list of third party extensions to the computing system model and how to launch them (such as, plug-ins, etc.). Lastly, it can contain the name and identification of a currently enforced web filter, whether that filter belongs to the computing system or a third party. This and other such policy-oriented subject matter may be used to help, users generally, and parents specifically, to control actions in any given computing environment.

In contrast to the system silo 308, the user silo 310 may be implemented on a per-controlled user basis—where there may be more than one user per machine or one user per multiple machines. In the user silo 310, polices may be implemented that determine whether the logging of events is required for a particular user. Next, the user silo 310 may have policies regarding the hourly logon restriction applied to a particular user and the corresponding hours that those restrictions apply. Also, the silo can have polices that answer the question whether a user is allowed to make requests for overrides concerning web and game activity. And, lastly, for example, polices may be implemented regarding general application restrictions and whether they are turned on for a particular user—if so, lists of file paths may have to be allowed or blocked.

The game silo 312 can contain policies as to whether particular games (or any games at all) are permitted. If certain games are permitted, a further policy may be applied as to whether unrated games are permitted. This, illustrates the notion that polices can be interrelated not only in the temporal sense that one policy may necessarily follow another, but in the causal sense that one policy may have impact on another policy.

A policy may be implemented regarding the current maximum game rating permitted. For example, if a parent wants to prevent child exposure to violent games, such a parent may set such a maximum rating that the child may be exposed to play. Any game that is above this rating will simply not play. Furthermore, a list of rating descriptors which are blocked for a user may be provided in the game silo 312—such as blood, gambling, etc. And lastly, by example and not limitation, a list of explicitly allowed or blocked games may be resident in the silo 312, such that when an external compliant application queries the compliant interface 302 regarding a particular game, a policy answer can be given and the associated actions can be followed.

Finally, regarding the web silo 312, a policy can be established whether a filter should be in use or whether file downloads are permitted. More specifically, the level of filtering can be established or the types of file downloads can be enumerated or described. It can also be established whether unrated sites are permitted. Additionally, a list of explicitly blocked categories (e.g. hate, racism, etc.) or explicitly blocked URLs (www.norml.com) can be provided.

The aforementioned policies can represent parents' areas of concern. For example, polices can be applied to system events. A parent may want to know when a child is trying (or has tried) to change the time settings of a computer system. There are various reasons why polices may be employed to prevent the changing of time settings. For example, a child may be prevented from surfing the Internet at particular hours in the day, and changing the time settings might obviate a surfing-during-off-hours restriction. In general, polices can be employed that prevent activities that attempt to get around parental (or other types) of restrictions.

The presently disclosed subject matter, of course, extends in applicability not only to the simple case where a child clicks on a clock-setting icon and tries to change the clock, but also to cases where a more sophisticated user attempts to change, for example, the BIOS. One way to flag such behavior is log suspicious behavior and to provide a notification regarding such behavior. For instance, a logging service could notify an administrator that the last time a computer booted up was three days later than the current time—thus suggesting that some clock manipulation must have occurred. One of ordinary skill in the art could easily imagine other policies that could be employed to prevent the obviation of such restrictions.

Figure 4:
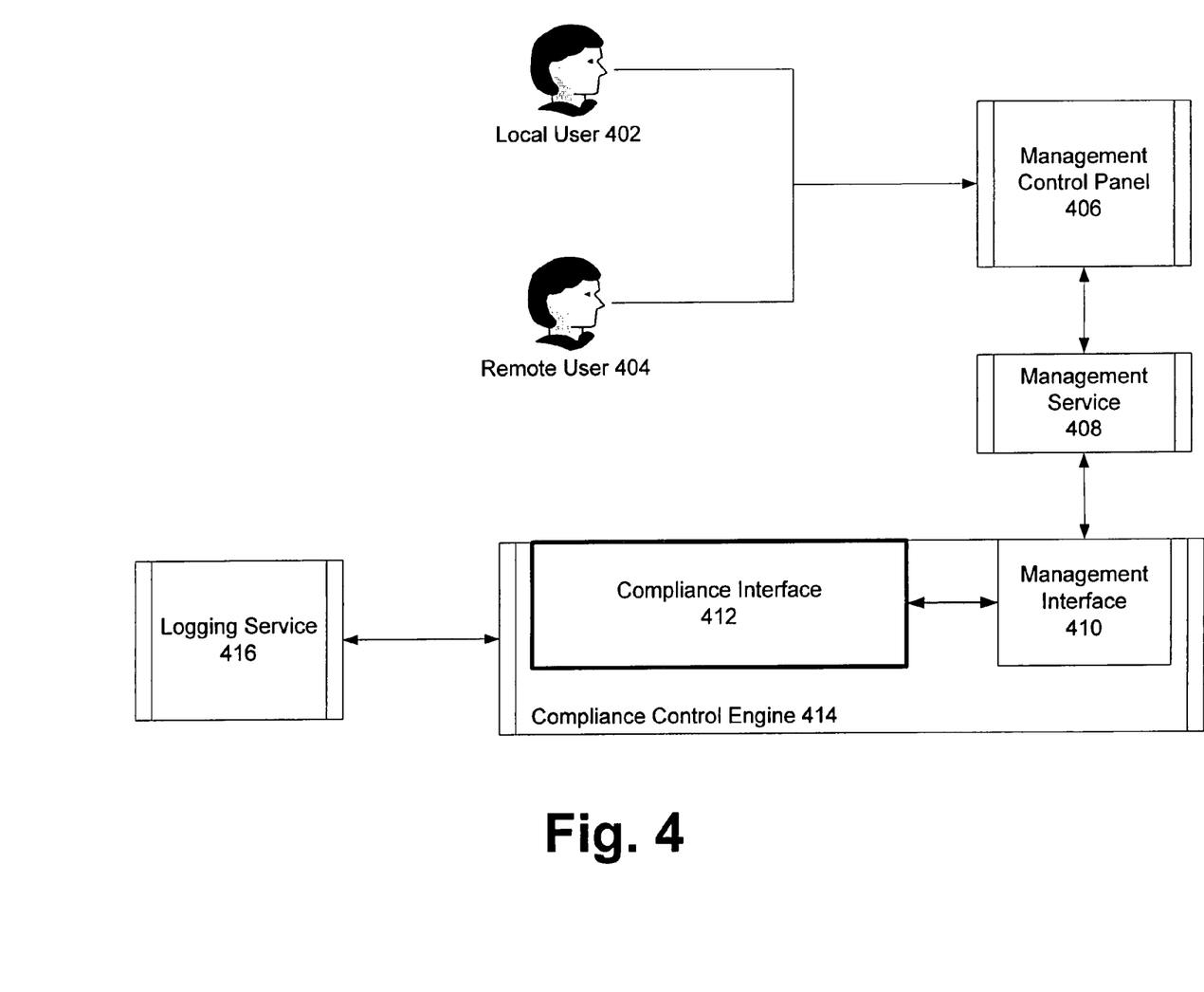
FIG. 4 illustrates the various types of input or feedback that can be provided for policy making, where the resulting policies may be interpreted by the compliance interface.

FIG. 4 illustrates the various types of input or feedback that can be provided for policy making, such that the resulting policies can be interpreted and implemented by the compliance interface. For example, one type of feedback is leveraged off of a logging service 416. The logging service 416 may log parental control settings changes, when and what games started, URLs visited, the starting and ending of processes, logon, failed logon attempt, logoff, account changes, system clock changes, and applications blocked. These logging events may be logged by the computing system employing the compliance interface 412.

Conversely, other logging events may be logged by the third parties providing the aforementioned compliant applications. For example, such events may include: email received, email sent, media playback, instant messaging, file download, instant message special feature used (e.g. audio, webcam, file swap, etc.), game end, email contact list change, instant message contact list change, and custom third party events.

Thus, the logging service 416 provides one type of feedback upon which the policies the compliance interface 412 interprets may be altered. Another type of input for altering policies may be made by either local users 402 or remote users 404. Local users 402, as administrators, may set or change policies on a computer. For example, this may entail a parent setting or altering the parental control settings on a computer. Importantly, however, policies may also be inputted by remote users 404. Thus, parents can remotely change polices on a child's computer without ever having to log on to the child's computer.

In such a case, the parent can set (or alter) the policies via a management control panel 406—as discussed with reference to FIG. 1. This control panel 406 can interact with a management service 408, which serves as a common entry point to the management interfaces 410. The compliance interface 412 can then be based off of these interfaces 410 in such a way as to provide the most salient interfaces to third party providers of applications compliant with the interface 412.

Exemplary Implementation of Aspects of the Compliance Interface

Figure 5:
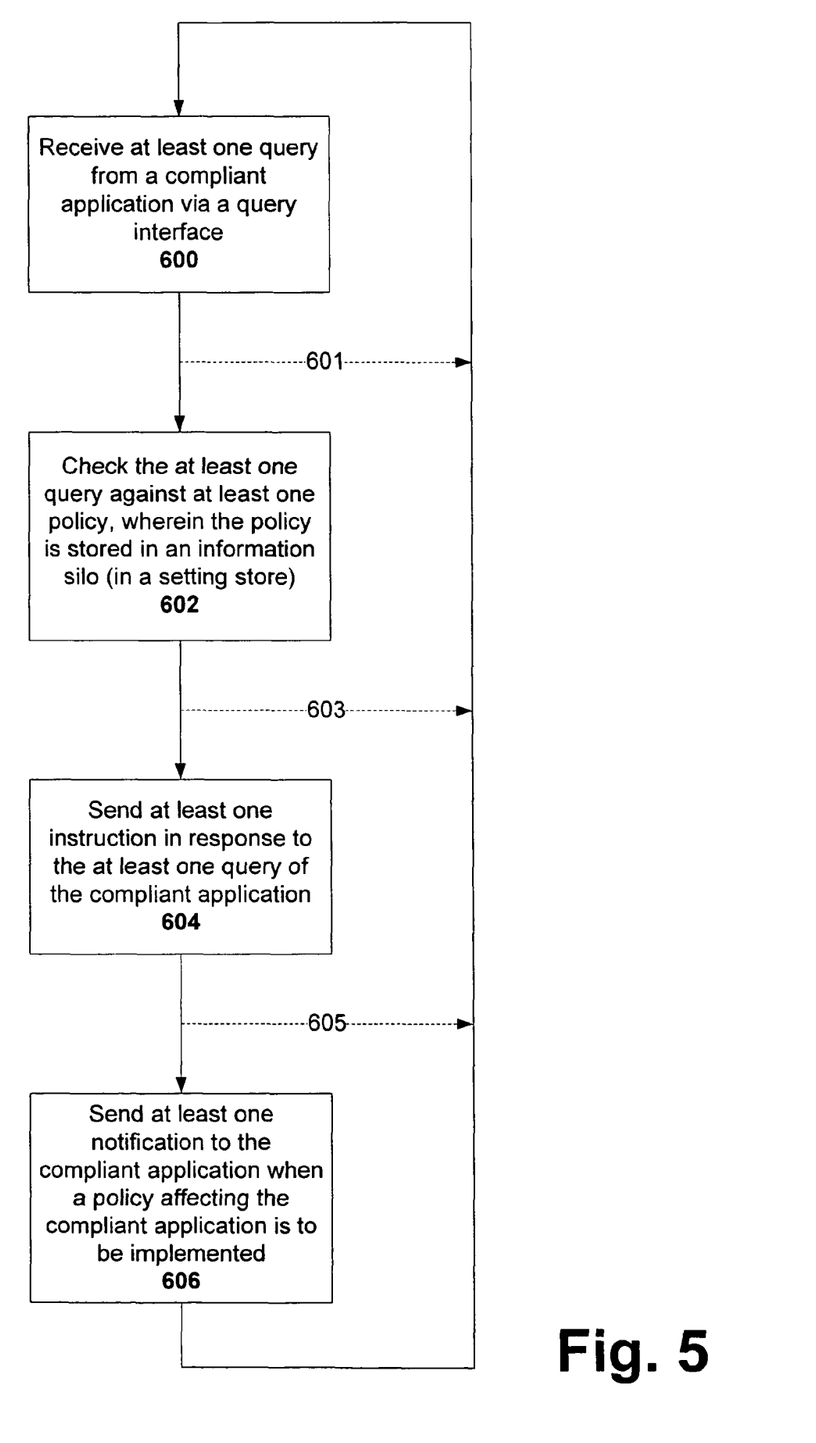
FIG. 5 presents in block diagram form one exemplary implementation of the compliance interface.

There are many ways in which aspects of the compliance interface can be implemented. FIG. 5 presents in block diagram form one such exemplary implementation of the compliance interface. Thus, at block 600 at least one query from a compliant application is received via a query interface. Such a query may inquire as to what policies are associated with a particular compliant application. For example, a gaming application may ask what policies are associated with its own content, such as graphic violence or adult language.

Next, at block 602, the query can be checked against a stored policy related to the query, wherein the policy may be stored in an information silo(s)—as discussed in reference to FIG. 3. The compliance interface can interpret the stored policy and what actions the compliant application should follow. The compliance interface may, in fact, interpret several such policies that may apply to the compliant application and any related policies that may have an impact, whether at that time or at a future time, on the compliant application.

At block 604, at least one instruction is sent in response to the at least one query to the compliant. Such an instruction may provide information to the compliant application as to the course of action that it is expected to take in order to stay compliant. If, for example, the policy is not to expose a user to violent content, a compliant gaming application that has such content might simply block itself and not run.

At block 606, at least one notification is sent to the compliant application when a policy affecting the compliant application is to be implemented, whether at the present or in the future. Such a notification may allow a compliant application to prepare for events which may affect it. As already discussed above, a media player may want to know in advance or be made aware of the fact when a user is going to be logged out, such that it can stop playing content upon such log-out.

Lastly, block 606 feeds back to block 600. This relationship shows that upon the sending of the instruction, the compliance interface is ready for the next query. However, as the dashed lines 601, 603, and 605 show, the compliance interface may revert to block 600 at any time during the 600 to 606 process, since it does not have to provide notifications or instructions to the compliant applications.

While the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, a compliant interface was provided, where the interface may mediate between compliant applications and a set of stored polices which may be set by a user. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A computing system having a processor wherein the processor executes instructions to implement a user controlled application program interface (API) allowing application compliance according to computer system policies, the API comprising:

a query interface implemented on said processor, said query interface providing queries from a compliant application to the API for checking by the API against multiple polices regarding restrictions on features that are exposed by the compliant application and stored in a settings store of the computing system, wherein the policies are set to protect the user from exposure to application features deemed to be harmful to the user;

a notification interface implemented on said processor, said notification interface providing a notification to the compliant application as to which policies are being implemented by said processor, the notification interface further notifying the compliant application and other compliant applications affected by said implemented policies of the impact of compliance with the implemented policies; and an instruction interface implemented on said processor, the instruction interface providing an instruction to the compliant application to implement a particular behavior in regard to an implemented policy.

2. The computing system according to claim 1, wherein at least one of the query interface, the notification interface, and the instruction interface is configured to at least one of receive arguments from and return arguments to the compliant application.

3. The computing system according to claim 1, wherein each of the computer system policies is interpreted by the API and is applied across the computing system.

4. The computing system according to claim 1, wherein the API is extensible beyond the query interface, the notification interface, and the instruction interface and includes a feedback mechanism that provides information that may be used to verify compliance with policies in regard to a particular user and to alter policies in regard to the particular user.

5. The computing system according to claim 4, wherein the feedback information is provided by a logging service that logs events of the particular user and is used to alter at least one policy.

6. The computing system according to claim 1, wherein the policies are set by a user via a control panel.

7. The computing system according to claim 1, wherein the policies are set remotely from the computing system.

8. The computing system according to claim 1, wherein the compliant application is provided to the computing system by a third-party vendor.

9. The computing system according to claim 1, wherein the compliant application comprises a computing system application.

10. The computing system according to claim 1, wherein the compliant application comprises a web application.

11. The computing system according to claim 1, wherein the compliant application comprises an instant messenger application.

12. The computing system according to claim 1, wherein the compliant application comprises a gaming application.

13. The computing system according to claim 1, wherein the compliant application comprises an email application.

14. The computing system according to claim 1, wherein the compliant application comprises a media player application.

15. The computing system according to claim 1, wherein the settings store comprises at least one silo associated with the compliant application.

16. A processor-implemented method for implementing restrictions on compliant applications of a computing system comprising:

the processor receiving at least one query from a compliant application via a query interface;

the processor checking the at least one query against multiple policies regarding restrictions on features that are exposed by the compliant application, wherein the policies are set to protect a user from exposure to application features deemed to be harmful to the user, and wherein the policies implemented in connection with the compliant application are stored in an information silo;

the processor sending at least one instruction to the compliant application in response to the at least one query of the compliant application, wherein the instruction instructs the compliant application to implement a particular behavior in regard to an implemented policy; and sending at least one notification to the compliant application when a policy affecting the compliant application is to be implemented, the notification notifying the compliant application and other compliant applications affected by the implemented policy of the impact of compliance with the implemented policy.

17. A computer readable storage medium bearing computer executable instructions, wherein the instructions provide for a user controlled application program interface (API) allowing application compliance according to computer system policies, comprising:

a query interface that provides queries from a compliant application to the API via the query interface for checking by the API against multiple polices regarding restrictions on features that are exposed by the compliant application, the policies being stored in a settings store, wherein the policies are set to protect the user from exposure to application features deemed to be harmful to the user;

an instruction interface that provides an instruction to the compliant application to implement a particular behavior in regard to an implemented policy; and a notification interface that provides a notification to the compliant application as to which policies are being implemented by a computing system on which the API resides, the notification interface further notifying the compliant application and other compliant applications affected by said implemented policies of the impact of compliance with the implemented policies.

* * * * *